STORAGE DISPLAY FOR REGENERATION OF IMAGES
Filed Sept. 6, 1960
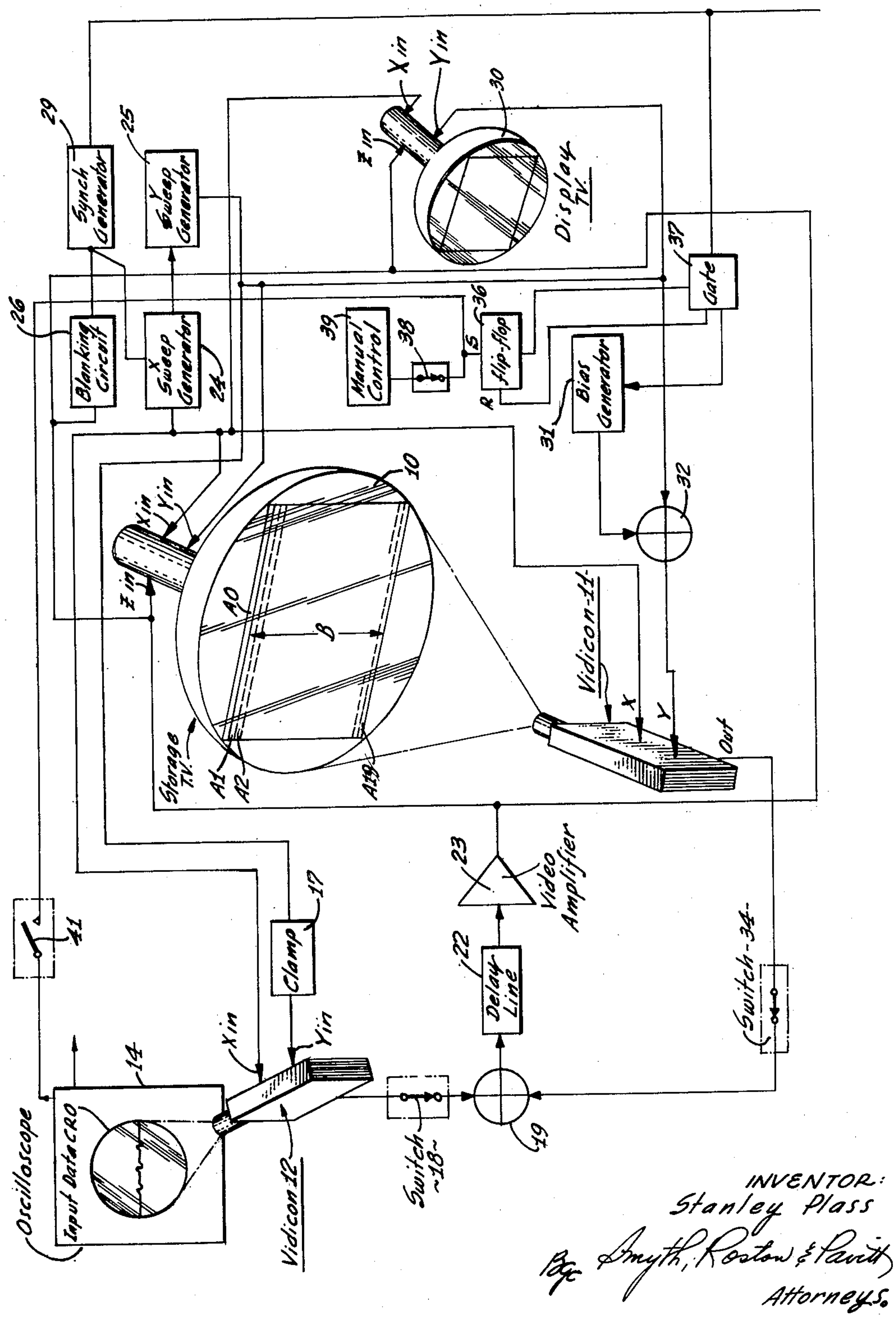
INVENTOR:
Stanley Plass
By Smyth, Roston & Pavitt
Attorneys.

3,153,699

STORAGE DISPLAY FOR REGENERATION OF IMAGES

Stanley Plass, Malibu, Calif., assignor to Packard-Bell Electronics Corporation, Los Angeles, Calif., a corporation of California Filed Sept. 6, 1960, Ser. No. 54,270
17 Claims. (Cl. 178—6.8)

This invention relates to memory type visual display systems and, more particularly, to such systems for regenerating and retaining images on the screens of cathode ray tubes.

Systems of this general type have been developed for regenerating a single frame of conventional type television signals and for providing the regenerated signals to a cathode ray tube for retracing and thereby retaining the image of the frame on the face of the tube. These systems permit a detailed examination of a particular frame of the television signals and they also facilitate editing procedures of film or tape upon which the television signals may be recorded.

There are applications, however, where not only is it desirable to regenerate and retain a transient image but where a comparison and correlation of one transient image with a number of other previous transient images are desirable. For example, there are applications in which it is desirable to retain the image of a curve traced by an oscilloscope and compare it with the curves previously traced by the oscilloscope. The specific illustrative embodiment of this invention is of a system of this type in which a comparison between one transient image and others preceding it in time is provided.

In the specific illustrative embodiment, line-scanning means, which may be a storage cathode ray tube, is utilized for providing, in one frame, images of a number of different successive oscilloscope traces or other like transient input data. The different images represent traces or curves provided at different intervals on the face of an input oscilloscope. Regenerating means are provided for retracing the oscilloscope traces on the face of the storage cathode ray tube. The display system includes switching means which can be set to regenerate the entire image so that the same oscilloscope traces are retraced on the face of the storage cathode ray tube. The regeneration means includes a vidicon camera for scanning the image on the screen of the storage cathode ray tube, and delay means coupled between the output of the vidicon camera and the input of the storage cathode ray tube.

Features of this invention relate to the provision of means for introducing signals representing an input oscilloscope trace to the storage cathode ray tube. An image or input trace may be provided across the top of the screen of the storage cathode ray tube, and the previous oscilloscope traces in time sequence are provided successively below it. As the successive oscilloscope traces are introduced to the storage cathode ray tube, the image on the face of the tube appears to roll downwardly because each new trace is introduced at the top of the screen whereas the lowest trace is discarded.

Further features of this invention relate to the provision of display means in the form of the storage cathode ray tube which simultaneously provides images of successive oscilloscope traces in time sequence where the oscilloscope may be operating at any speed in a wide range of trace speeds. The line repetition rate and frame repetition rate of the storage cathode ray tube need not be varied for different oscilloscope trace speeds. Means are provided for stepping the vertical deflection potential at the end of an oscilloscope trace to shift the successive traces on the face of the storage cathode ray tube.

Still other features relate to the provision of means for delaying the operation of the vidicon camera which scans the input oscilloscope to a predetermined interval related to the storage cathode ray tube sequence. Synchronizing means are provided for operating the vidicon cameras and the storage cathode ray tube. A display cathode ray tube may be provided in the event separate display means for an operator are not provided at the storage cathode ray tube.

Further advantages and features of this invention will become apparent upon consideration of the following description when read in conjunction with the single figure wherein:

The single figure is a functional representation of the visual display system of this invention.

Referring to the single figure, a memory type visual display system is provided in which a storage cathode ray tube 10 may be controlled to retrace the same image over and over or it may be controlled to shift a number of successive images provided on its face. The scanning sequence of the cathode ray tube 10 may be conventional except that the scanning is from the bottom to the top of the screen instead of from the top to the bottom. The sweep voltages are introduced to the cathode ray tube 10 from two sweep generators 24 and 25 which are driven in synchronism by a generator 29. The sweep generator 24 controls the horizontal or X direction of the beam in the tube 10, and the generator 25 controls the vertical or Y direction of deflection of the beam in the tube 10.

Each frame of the scanning sequence may consist of 525 horizontal lines, each of which may be 63.5 microseconds in duration. Only approximately 460 of these lines are active or visible lines because approximately 65 horizontal lines are utilized for the vertical blanking period. The sweep generator 24 may operate at a repetition rate of 15,750 pulses per second, and the sweep generator 25 may operate at a repetition rate of 30 pulses per second. Interlaced scanning is not utilized in the specific illustrative embodiment.

The generator 29 also drives a blanking circuit 26 which develops both horizontal and vertical blanking pulses and introduces them to the control grid or Z input of the cathode ray tube 10 to blank the beam in the cathode ray tube 10 during the retrace intervals.

The image on the face of the cathode ray tube 10 may consist of a plurality of different images A0 to A19, one above the other. These images may illustratively be of oscilloscope traces in timed sequence with the most recent trace A0 being along the top of the screen of the tube 10. Each of the incremental images A0 to A19 may include 23 horizontal lines so that 20 such incremental images are provided, one above the other, across the face of the tube 10. As indicated above, the total number of active lines may be 460. The area designated A0 in the single figure represents the most recent incremental image and the area B represents the other nineteen incremental images A1 to A19.

With a switch 34 closed and a switch 18 opened, the 20 incremental images A0 to A19 are retraced repeatedly on the face of the cathode ray tube 10. The switches 34 and 18 may be manual switches or electronic switches of known types. As described above, the scanning sequence of the storage tube 10 is such as to begin at the bottom and to proceed, line by line, up the face of the tube 10.

A storage vidicon or television camera 11, which may be positioned in front of the cathode ray tube 10, is operated in synchronization therewith. The camera 11 may also be internal within the envelope of the tube 10, or it may be positioned to view the tube 10 through optical deflection means. The camera 11 includes line scanning means for scanning the images A0 to A19 on the screen of the cathode ray tube 10. The sweep signals from the generator 25 are provided through an adding circuit 32 to the vertical deflection coils or Y input of the vidicon 11, and the sweep signals from the generator 24 are provided directly to the horizontal deflection coil or X input of the vidicon 11. The vidicon 11 may be any conventional line scanning television camera or like device having a light sensitive mosaic. The vidicon 11 is operated in direct synchronization with the tube 10 but its beam is aimed one horizontal line higher than that which is being written on the face of the storage tube 10. In other words, due to the fact that the lines are successively provided from the bottom to the top of the tube 10, the vidicon 11 scans a line of the previous frame at the tube 10 just before it is retraced by the beam in the cathode ray tube 10. In this manner, as the scanning sequence continues, the vidicon 11 scans the image of the tube 10 line by line and then immediately thereafter, 63.5 microseconds later, the line just scanned by the vidicon 11 is retraced by the storage tube 10. The cathode ray tube 10 includes a fluorescent screen having a retentivity greater than one frame interval.

The signals developed by the vidicon 11 are provided through the switch 34 and an adding circuit 19 to a delay line 22. The delay line 22 may provide for a delay equivalent to one horizontal line of the scanning sequence. As indicated above, such a delay is 63.5 microseconds in the particular illustrative embodiment described herein. The delayed signals are introduced to a vidicon amplifier 23 which is coupled to the Z input or control grid of the storage cathode ray tube 10. The delay provided by the delay line 22 compensates for the fact that the vidicon 11 is scanning the traces one line ahead of the beam in the storage tube 10. The signals introduced, therefore, through the vidicon amplifier 23 have the same time position in the frame as they originally had when introduced to the tube 10.

The sequence continues in this manner with the vidicon 11 reading one line ahead of the tube 10 and with the signals of the vidicon 11 being delayed by one line at the delay line 22 so as to be reinserted in proper time position to the storage tube 10. The resulting arrangement is a persistence display system in which a raster scan or frame once written is maintained indefinitely. The vidicon camera 11 sweeps across the storage tube 10 reading the information which is decaying thereat and the information is reintroduced after amplification to brighten and intensify the image at the same exact location on the screen of the tube 10. As long as the switch 34 remains closed, the signals are continuously recycled, but if the switch 34 is opened, the image persistence ceases.

One or more display cathode ray tubes 30 may be provided which are operated in synchronization with the storage tube 10 for providing an image of the display on the face of the tube 10 to an operator. The sweep signals from the generators 24 and 25 are also introduced to each display tube 30 and the amplified video signals from the amplifier 23 are introduced to the Z input of each display tube 30.

As described above, the system includes two switches 34 and 18 and the above persistence display sequence of operations occurs when the switch 34 is closed and the switch 18 is opened. Assume now that the switch 18 is closed and the switch 34 is opened. A second vidicon 12, which may be similar to the vidicon 11, is coupled by the switch 18 to the adding circuit 19 so that the video signals developed at the vidicon 12 are introduced to the cathode ray tube 10. The vidicon tube 12 may scan the face of an oscilloscope 14 or other input means for providing an input image. With the switch 34 opened and the switch 18 closed, the image provided on the face of the tube 10 is not regenerated or recycled so that the tube 10 merely provides the image scanned by the vidicon 12. If the condition of the switches 18 and 34 are then reversed, the image of the last frame provided at the storage tube 10 would be repeatedly regenerated in the manner described above.

In addition to the two switches 18 and 34. the system includes a switch 41 connected to the oscilloscope 14, and also a switch 38 connected to a manual control circuit 39 which is hereinafter described. If the switches 18 and 34 are both closed then an input is periodically provided from the vidicon 12 under control of a clamping circuit 17. As is hereinafter described, the circuit 17 clamps the vertical deflection of the beam in the vidicon 12 so that effective scanning occurs only during the last 23 lines of the scanning frame. The switch 34 provides for recycling the image on the face of the tube 10, and the image is periodically modified at A0 by the vidicon 12.

When the switch 41, however, is also closed, the images on the face of the tube 10 are shifted downward each time a trace is completed at the oscilloscope 14.

The oscilloscope 14 is connected by the switch 41 to a flip-flop circuit 36. If the switch 41 is closed the oscilloscope 14 provides a control potential at the end of each oscilloscope trace to set the flip-flop circuit 36. The end of a trace occurs when the X or horizontal deflection potential at the oscilloscope reaches a maximum value. When the circuit 36 sets it enables a gate 37.

The vertical synchronizing pulses from the generator 29 are provided to a gate 37 which is normally disabled. The gate 37, however, is abled by a flip-flop circuit 36 at the end of an oscilloscope trace. The next vertical synchronizing pulse is provided through the gate 37 to operate a bias generator 31. The bias generator 31 provides a stepping potential of a predetermined magnitude through the adding circuit 32 to the horizontal deflection coil of the vidicon camera 11.

The stepping potential is applied to the Y axis or vertical deflection means in the vidicon 11. The magnitude of the vertical deflection bias potential may be such as to be substantially equivalent to the vertical height of one of the incremental images A0 to A19 on the face of the tube 10. Such a height is equivalent to vertical spacing of 23 horizontal lines because, as described above, each incremental image A0 to A19 consists of 23 active lines. The stepping potential is provided from the bias generator 31 responsive to a pulse from the synchronizing generator 29 at the end of a frame.

The flip-flop circuit 36 and the gate 37 insure that the vidicon 11 does not step responsive to the end of an oscilloscope trace at the middle of a frame of the vidicon 11 but steps between frames or before a frame commences. In this manner, the vidicon 11 begins the next trace at the 24th horizontal line from the bottom, or at the beginning of the second incremental image A18 from the bottom instead of from the lowest incremental image A19 along the bottom of the face of the tube 10. The bias generator 31 only applies the stepping potential for the duration of one frame, which is for one-thirtieth of a second. Thereafter, the bias potential returns to its normal value. During the first frame, when the bias stepping potential is applied, the vidicon 11 only scans 19 of the incremental images A18 to A0.

With the switch 34 closed as indicated above, the signals from the vidicon 11 are provided to the adding circuit 19. Durng the 20th image interval (the last 23 active lines), the vidicon 11 does not provide video signals representing an image because it is scanning above the image A0. The vidicon 12, however, does provide signals at this time. The vidicon 12 is synchronized with the sweep generators 24 and 25, and the vertical deflection is controlled by means of the clamping circuit 17, mentioned above, which is coupled between the sweep generator 25 and the vertical deflection coil, not shown, of the vidicon 12. The clamping circuit 17 may be any device or circuit which prevents vertical deflection at the tube 12 until after the vertical deflection potential exceeds a predetermined value. In other words, the vertical deflection potential is clamped until it attains a predetermined value. The vidicon 12, accordingly, does not effectively scan the oscilloscope 14 during this initial or clamped portion of its scanning sequence. The clamping potential is exceeded at the beginning of the last 23 active lines of the frame (lines 438 to 460) of the tube. The vidicon 12 scans the oscilloscope trace during these last 23 active lines of the tube 10 and couples the vidicon signals representing the oscilloscope trace through the switch 18 and the adding circuit 19 to the delay line 22. The camera 12 is oriented so that it scans the oscilloscope 14 during the last portion of its scanning cycle.

The signals from the vidicon 12 follow in sequence the signals representing the 19 previous incremental images A18 to A0 developed by the vidicon 11 from the face of the storage tube 10. The 19 images A18 to A0 are scanned before the oscilloscope 14 is scanned because of the stepping bias potential from the generator 31 to the vidicon 11.

When the stepping potential from the generator 31 terminates, the regenerative scans continue in an uninterrupted manner, with the vidicon 11 scanning all twenty incremental images A19 to A0 and recycling the video signals through the delay line 22 and the amplifier 23 back to the tube 10. With the switch 18 closed at this time, the vidicon 12 scans the new oscilloscope trace 14 and these signals are added to the 20th incremental image A0 at the tube 20. In other words, the signals introduced during the 20th image interval include signals from both the vidicon 11 and the vidicon 12. When the trace is completed at the oscilloscope 14, the vidicon 11 is stepped to shift the time sequence images on the face of the tube 10 and to insert the latest incremental image from the oscilloscope 14 across the top of the tube 10, at the area A0, while dropping the earliest trace which previously was along the bottom of the tube 10, at the area A19.

Switch 41 may be open so that the image pattern on the face of the tube 10 is not automatically shifted, and the manual control 39 may be utilized for shifting the pattern of images if so desired. A control potential is provided from the manual control 39 through the switch 38 to the flip-flop circuit 36. The flip-flop circuit 36 enables the gate 37 to permit the operation of a generator 31. When the generator 31 is operated, the pulse through the gate 37 also resets the flip-flop circuit 36 to return the gate 37 to its normal condition.

With switch 41 closed, the stepping sequence is automatic with oscilloscope trace after oscilloscope trace being added at the top of the screen of the tube 10 and the oldest trace being concurrently deleted. The effect to the viewer of the tube 10 or the display tube 30 is that of a downwardly rolling image disappearing at the bottom with new material being added at the top. The frame and line repetition rates of the tube 10 and cameras 11 and 12 need not be synchronized with the operation of the oscilloscope scans which may be either slow or rapid when compared therewith. The faster the oscilloscope trace repetition rate, the faster the rolling effect on the face of the tube.

If the oscilloscope repetition rate is equal to or greater than the frame repetition rate of the tube 10, a new trace is added at A0 in each frame. The effect is such that an image takes ⅔ of a second to move from the top to the bottom of the face of the tube 10. This effective rolling rate is due to the fact that there are 20 areas, A0 to A19, and the frame repetition rate is 30 times per second.

Although this invention has been disclosed and illustrated with reference to particular applications, the principles involved are susceptible of numerous other applications which will be apparent to persons skilled in the art. For example, the number of images A0 to A19 is illustrative and the number of lines per image is illustrative. Further, the utilization of an oscilloscope trace as the input is also illustrative as any other type of input information may be provided. Such input information may be in the form of a stock tickertape, or instruments or gauges, etc. Scanning line-by-line from the bottom at the tube 10 provides for a downward rolling effect whereas scanning line-by-line from the top would provide for an upward rolling effect. The invention is, therefore, to be limited only as indicated by the scope of the appended claims.

I claim:

1. A display system including, line scanning means for providing a first image in accordance with video signals introduced thereto, a line scanning camera for scanning the first image provided by said line scanning means and for developing signals in accordance therewith, said camera including deflection means for controlling the portions of the first image which are scanned by said camera, means coupled to said deflection means for synchronizing the operation of said camera with said line scanning means, circuit means connected to said camera and to said line scanning means for introducing the signals developed by said camera to said line scanning means, control means coupled to said deflection means for periodically adjusting the deflection means so as to periodically shift the first image provided at said line scanning means, and means coupled to the line scanning means for introducing signals representing a new image to the line scanning means for display at the portions of the line scanning means from which the first image has been shifted.

2. A display system, including, line scanning means for providing an image in accordance with video signals introduced thereto, a line scanning camera for scanning the image provided by said line scanning means and for developing signals in accordance therewith, said camera including deflection control means for controlling the area of the image which is scanned by said camera, means for synchronizing the operation of said camera with said line scanning means, circuit means connected to said camera and to said line scanning means for introducing the signals developed by said camera to said line scanning means, control means coupled to said camera for introducing a control signal to said deflection control means so as to shift the image provided at said line scanning means, input means for periodically introducing video signals to said line scanning means for providing an image at said line scanning means in accordance with said signals, and circuit means connected to said input means and responsive to each periodic operation of said input means for operating said control means whereby the image provided at said line scanning means is shifted after each periodic operation of said input means.

3. In combination, a first cathode ray tube having an input terminal and having a fluorescent screen for providing line scan visual indications in accordance with the video signals received at the input terminal; and means disposed relative to the fluorescent screen on the first cathode ray tube and responsive to the visual indications for regenerating the visual indications on said first cathode ray tube, said means including a second cathode ray tube having a deflection control, and a light sensitive mosaic for scanning the visual indication on the screen of said first cathode ray tube, said second cathode ray tube being positioned to scan a line on the screen of said first cathode ray tube before it is retraced by said first cathode ray tube, and delay circuit means coupled between said first and said second cathode ray tubes for delaying the signals from said second cathode ray tube to said first cathode ray tube by an interval related to the interval between which a line is scanned and is then retraced on the screen of said first cathode ray tube.

4. In combination, in accordance with claim 3 in which the delay interval provided by said delay circuit means is equal to the duration of one line scan of said first and said second cathode ray tubes.

5. In combination, a first cathode ray tube having an input terminal and having a fluorescent screen for providing line scan visual indications in accordance with the video signals received at the input terminal; and means disposed relative to the fluorescent screen on the first cathode ray tube and responsive to the visual indications for regenerating the visual indications on said first cathode ray tube, said means including a second cathode ray tube having a deflection control and having a light sensitive mosaic for scanning the visual indication on the screen of said first cathode ray tube, said second cathode ray tube being positioned relative to said first cathode ray tube to scan a line on the screen of said first cathode ray tube before it is retraced by said first cathode ray tube, and delay circuit means coupled between said first and said second cathode ray tubes for delaying the signals from said second cathode ray tube to said first cathode ray tube by an interval related to the interval between which a line is scanned and is then retraced on the screen of said first cathode ray tube, periodically operating input means coupled to said delay circuit means for introducing video signals representing a portion of the visual indication to be provided on the screen of said first cathode ray tube, and circuit means connected to said input means and to said second cathode ray tube and responsive to each periodic operation of said input means for introducing a control potential to said deflection control of said second cathode ray tube for a predetermined interval.

6. In combination, a first cathode ray tube having an input terminal and having a fluorescent screen for providing line scan visual indications in accordance with the video signals received at the input terminal; and means disposed relative to the fluorescent screen on the first cathode ray tube and responsive to the visual indications for regenerating the visual indications on said first cathode ray tube, said means including a second cathode ray tube having a deflection control and having a light sensitive mosaic for scanning the visual indication on the screen of said first cathode ray tube, said second cathode ray tube being positioned relative to the first cathode ray tube to scan a line on the screen of said first cathode ray tube before it is retraced by said first cathode ray tube, delay circuit means coupled between said first and said second cathode ray tubes for delaying the signals from said second cathode ray tube to said first cathode ray tube by an interval related to the interval between which a line is scanned and is then retraced on the screen of said first cathode ray tube, synchronizing means operatively coupled to said first and second cathode ray tubes for synchronizing the operation of said second cathode ray tube with said first cathode ray tube and for controlling the duration for providing a visual indication across the screen of the first cathode ray tube, periodically operating input means coupled to said delay circuit means for introducing to said delay circuit means video signals representing a portion of the visual indication to be provided on the screen of said first cathode ray tube, and circuit means connected to said input means and to said second cathode ray tube and responsive to each periodic operation of said input means for introducing a control potential to said deflection control of said second cathode ray tube for a predetermined interval related to the duration for providing a visual indication across the screen of said first cathode ray tube.

7. In combination, first line scanning means for providing images at a predetermined frame repetition rate, second line scanning means disposed relative to the first line scanning means for scanning the images, line-by-line, provided by said first line scanning means and for developing video signals in accordance therewith, periodically operating input means for providing video signals representing an input image, said input means having a repetition rate different than the frame repetition rate of said first line scanning means, means coupled to said second line scanning means and to said input means for combining the video signals therefrom and for introducing the combined signals to said first line scanning means, and circuit means connected to said input means and responsive to each periodic operation of said input means for introducing a deflection control potential to said second line scanning means for a duration equal to the duration of a frame at said first line scanning means.

8. In combination in accordance with claim 7, wherein, said circuit means includes means synchronized with said first line scanning means for delaying the introduction of the deflection control potential until after the termination of the frame in progress at said first line scanning means.

9. A display apparatus, including, line scanning means for successively providing images in accordance with first signals provided thereto, means synchronized with said line scanning means for successively regenerating portions of each of the successive images provided by said line scanning means, said regenerating means including adjustable means for controlling the portion of the successive images which are regenerated, circuit means synchronized with said line scanning means for providing signals to said line scanning means to complete the images provided at said line scaning means, and means coupled to said regenerating means for periodically providing a control signal to said adjustable means for activating said adjustable means to change the portions of the images which are regenerated.

10. A display system, including, cyclically operating cathode ray tube operative at a first particular frequency for successive providing line scan images in accordance with signals introduced thereto, input means operatively coupled to the cathode ray tube and operative at a second particularly frequency different from the first particular frequency for periodically introducing signals representing successive images in timed sequence to said cathode ray tube, means coupled to said introducing means and synchronized with the operation of said cathode ray tube for operating said input means during a particular portion of the operating cycle of said cathode ray tube, and means operatively coupled to said cathode ray tube and responsive during the rest of the operating cycle of said cathode ray tube for regenerating a predetermined portion of the image at said cathode ray tube whereby an image rolling effect is provided for the successive images represented by the signals from said introducing means.

11. A display system, including, a cyclically operating cathode ray tube for successively providing line scan images in accordance with signals introduced thereto. means for scanning predetermined portions of the images provided at said cathode ray tube and for providing line scan signals in accordance therewith, and delay means coupled to said scaninng means and said cathode ray tube for providing the signals from said scanning means back to said cathode ray tube in a particular delayed relationship to the scanning of the cathode ray tube to provide the predetermined portions of the line scan images at shifted positions at said cathode ray tube for the successive operating cycles of said cathode ray tube, and means coupled to the cathode ray tube for introducing signals representing new images to portions of the cathode ray tube from which the line scan images have been shifted.

12. A display system, including, a cyclically operating cathode ray tube for successively providing line scan images in acordance with signals introduced thereto, means operatively coupled to the cathode ray tube for scanning predetermined portions of the images provided at said cathode ray tube and for providing line scan signals in accordance therewith, delay means coupled to said scanning means and said cathode ray tube for providing the signals from said scanning means back to said cathode ray tube in a particular timed relationship to the scanning of the cathode ray tube to provide the predetermined portions of the images at shifted positions at said cathode ray tube for the successive operating cycles of said cathode ray tube, input means for periodically introducing signals representing successive images in timed sequence to the operation of said cathode ray tube, and means coupled to said input means and synchronized with the operation of said cathode ray tube for operating said input means during a particular portion of the operating cycle of said cathode ray tube such that the signals from said input means are provided in timed sequence with the signals from said delay means during each operating cycle of said cathode ray tube.

13. A display system, including, display means having a display face and constructed to provide an image on the display face in accordance with the characteristics of signals introduced to the display means, input means for providing input signals representing an image, means operatively coupled to the display means for scanning successive positions on the display means to activate such successive positions, means operatively coupled to the display means and the input means for obtaining an introduction of the input signals to the display means for the display of the image represented by the input signals in accordance with the activation of the successive positions on the display face of the display means, camera means disposed relative to the display means and having a particular displaced time relationship with the scanning of the successive positions on the display means for producing signals in representation of the image on the display means at such successive positions; and delay means coupled to the camera means and the display means for introducing the signals from the camera means to the display means after a particular delay dependent upon the particular timed relationship to obtain a regeneration of at least a portion of the image on the display face of the display means.

14. The display system set forth in claim 13, including, means operatively coupled to the camera means for providing a variation in the displaced time relationship between the operation of the camera means and the scanning of the successive positions on the display means to obtain a blanking of a portion of each image on the display means, and means operatively coupled to the input means and the display means for obtaining the introduction of signals from the input means to the display means to obtain the production of a new image on the display face of the display means in replacement of the image in the blanked portion of the display means.

15. The display system set forth in claim 14 in which the input means is constructed to scan successive positions and in which the input means and the display means are provided with relative rates of operation to obtain a rolling effect of the image on the display face of the display means and to obtain a blanking of progressive information from the display means and to obtain an introduction of progressive information from the input means to the display means.

16. A display system, including, first means for providing signals representing a visual image at successive positions along progresive lines of the image, scanning means including a display tube and connected to the signal means to receive the signals from the signal means and constructed to scan the display tube at successive positions along progressive lines and to produce images on the display tube in accordance with the characteristics of the signals from the signal means at each instant, second means disposed relative to the display tube of the first scanning means and operatively connected to the first scanning means for scanning the lines of the image on the display tube in a particular synchronized relationship with the scanning by the first scanning means and in a particular displaced relationship in time with respect to the scanning by the first scaning means, delay means operatively coupled to the second scanning means for delaying the signals from the second scanning means for a period of time dependent upon the displaced relationship between the operation of the first and second scanning means, and means operatively coupled to the first scanning means and the delay means for introducing the signals from the delay means to the first scanning means to obtain a reproduction on the display tube of the image represented by the signals.

17. The display system set forth in claim 16 in which the second scaning means is operatively coupled to the first scanning means to scan a particular number of integral lines ahead of the first scanning means and in which the delay means is constructed to delay the signals from the first scanning means by the particular number of integral lines.

References Cited in the file of this patent

UNITED STATES PATENTS

| | | |
|---|---|---|
| 2,521,635 | Kornei | Sept. 5, 1950 |
| 2,737,646 | Muffly | Mar. 6, 1956 |
| 2,774,964 | Baker | Dec. 18, 1956 |